Figure 20:
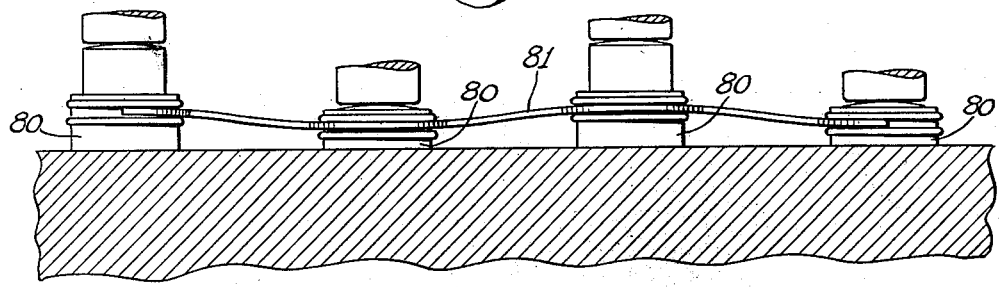

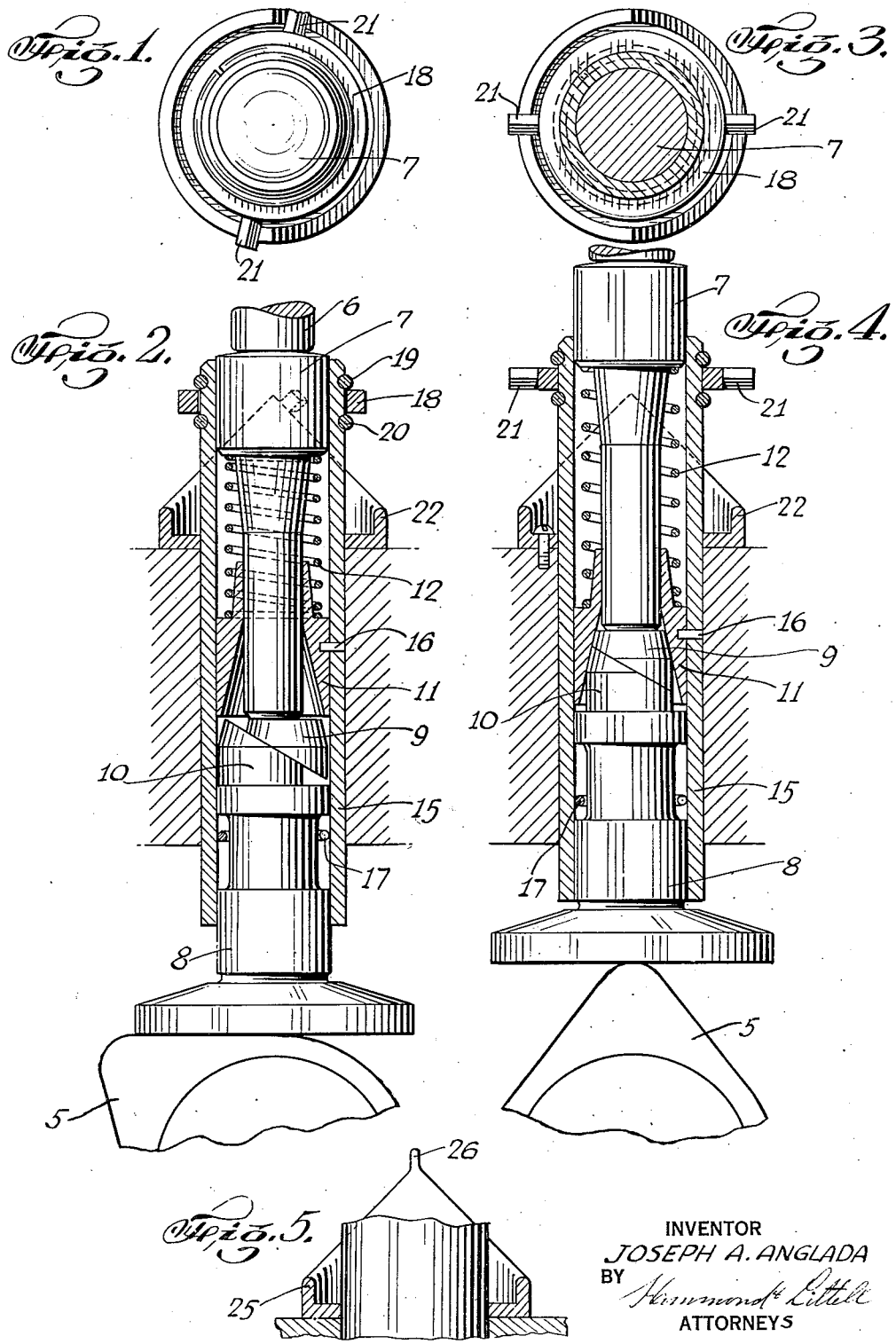

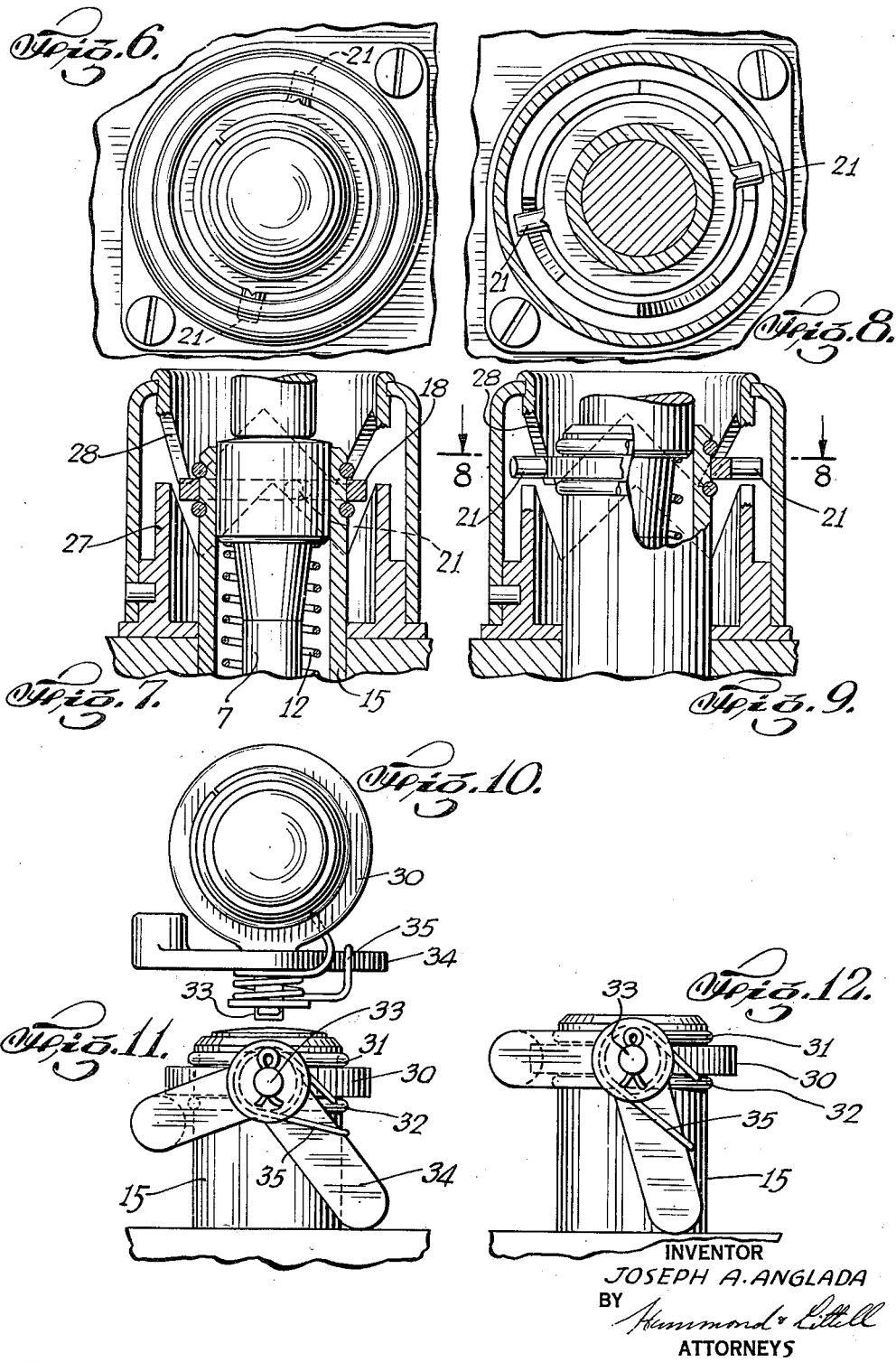

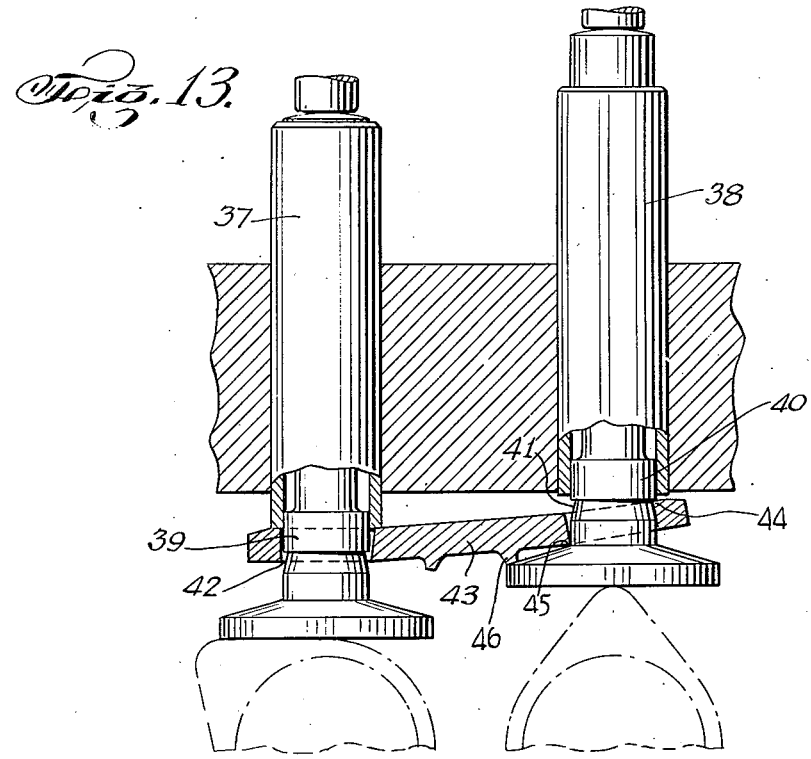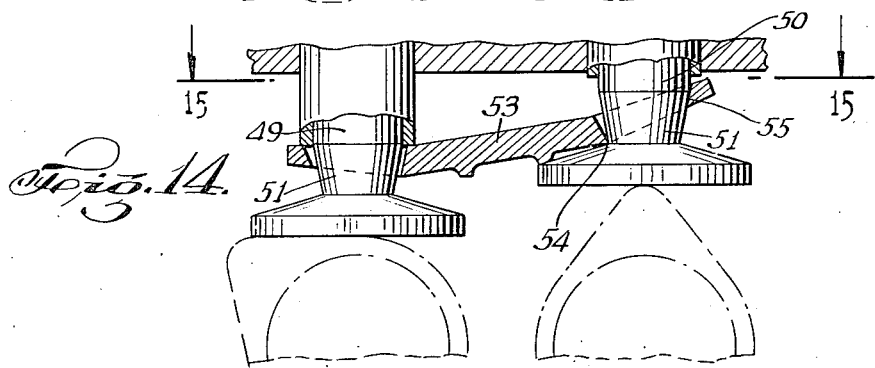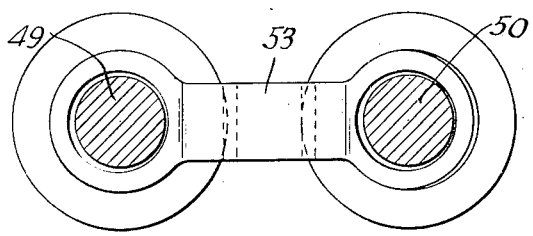

July 13, 1943.　　J. A. ANGLADA　　2,323,965
SLACK TAKE-UP DEVICE FOR TAPPETS
Filed April 12, 1939　　8 Sheets-Sheet 4
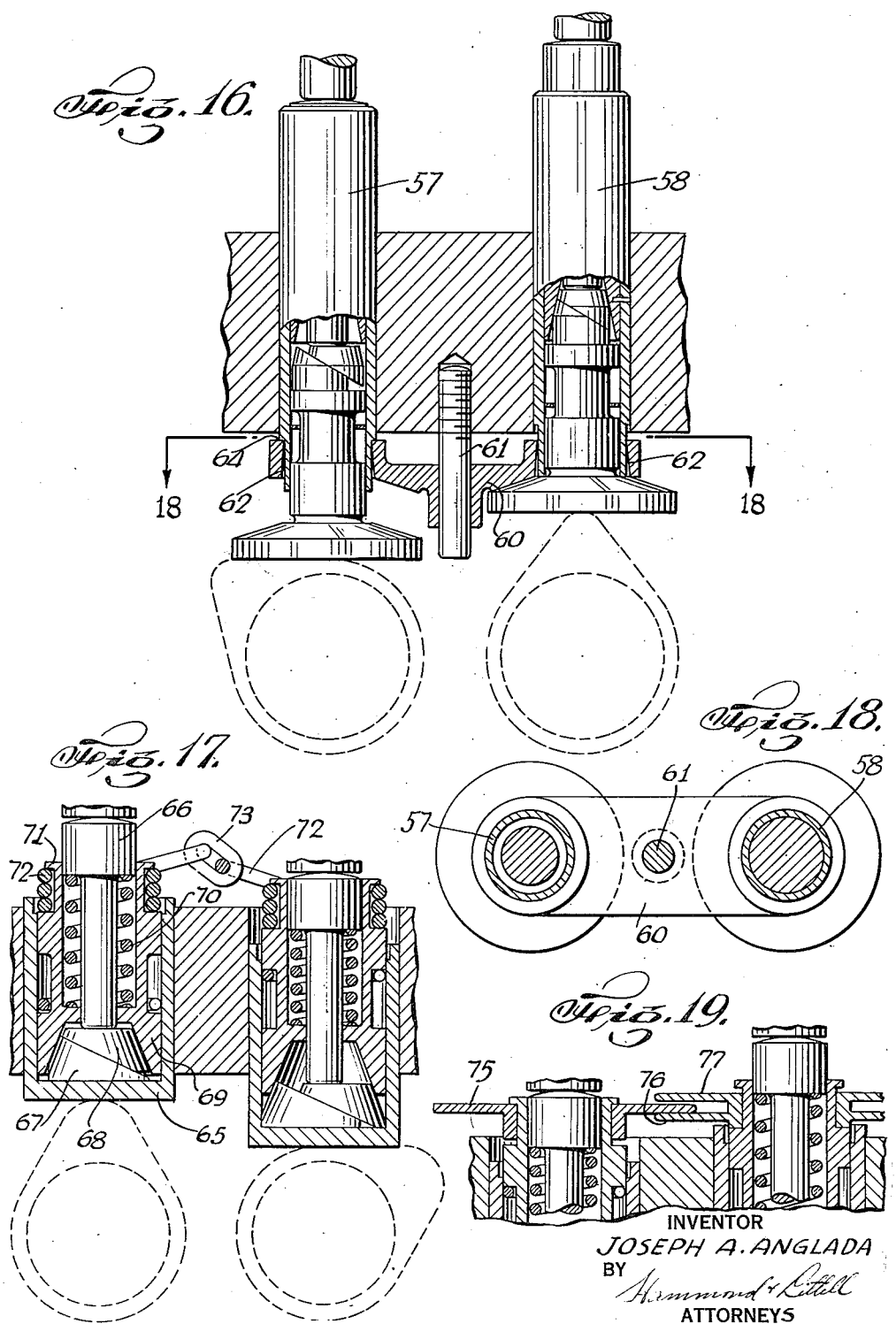
INVENTOR
JOSEPH A. ANGLADA
BY
Hammond & Littell
ATTORNEYS July 13, 1943.  J. A. ANGLADA  2,323,965
SLACK TAKE-UP DEVICE FOR TAPPETS
Filed April 12, 1939  8 Sheets-Sheet 5

INVENTOR
JOSEPH A. ANGLADA
BY
ATTORNEYS

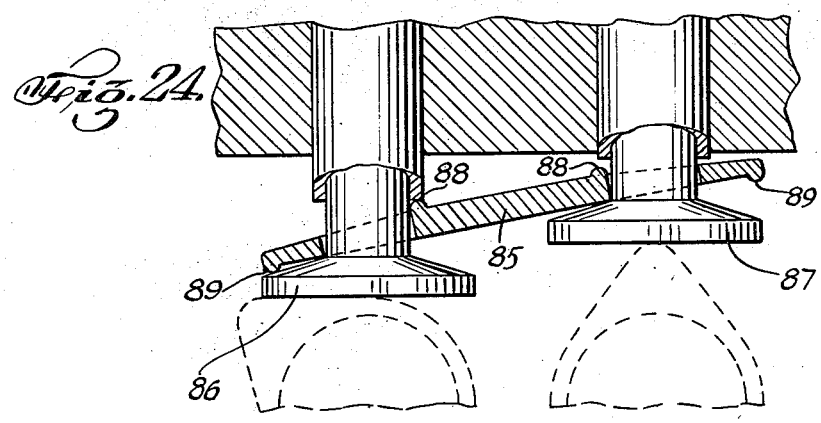
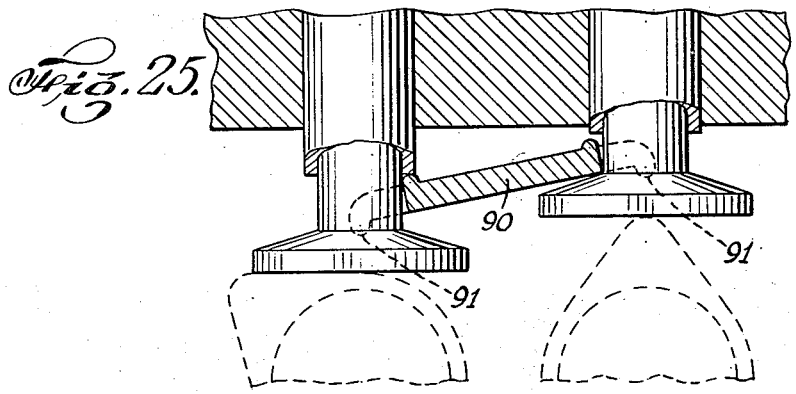
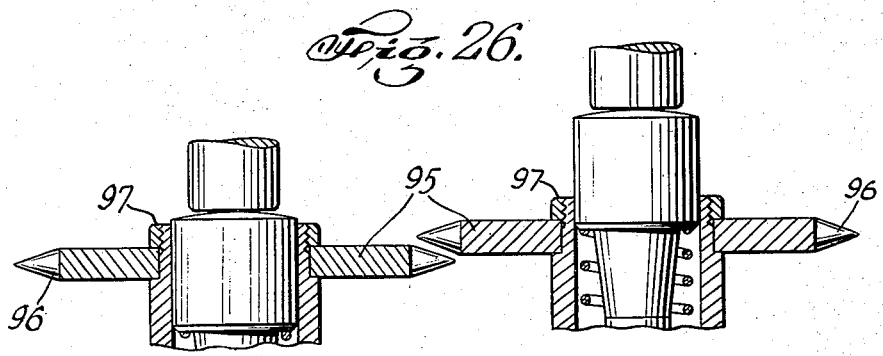

July 13, 1943.　　　　　J. A. ANGLADA　　　　2,323,965
SLACK TAKE-UP DEVICE FOR TAPPETS
Filed April 12, 1939　　　　8 Sheets-Sheet 7
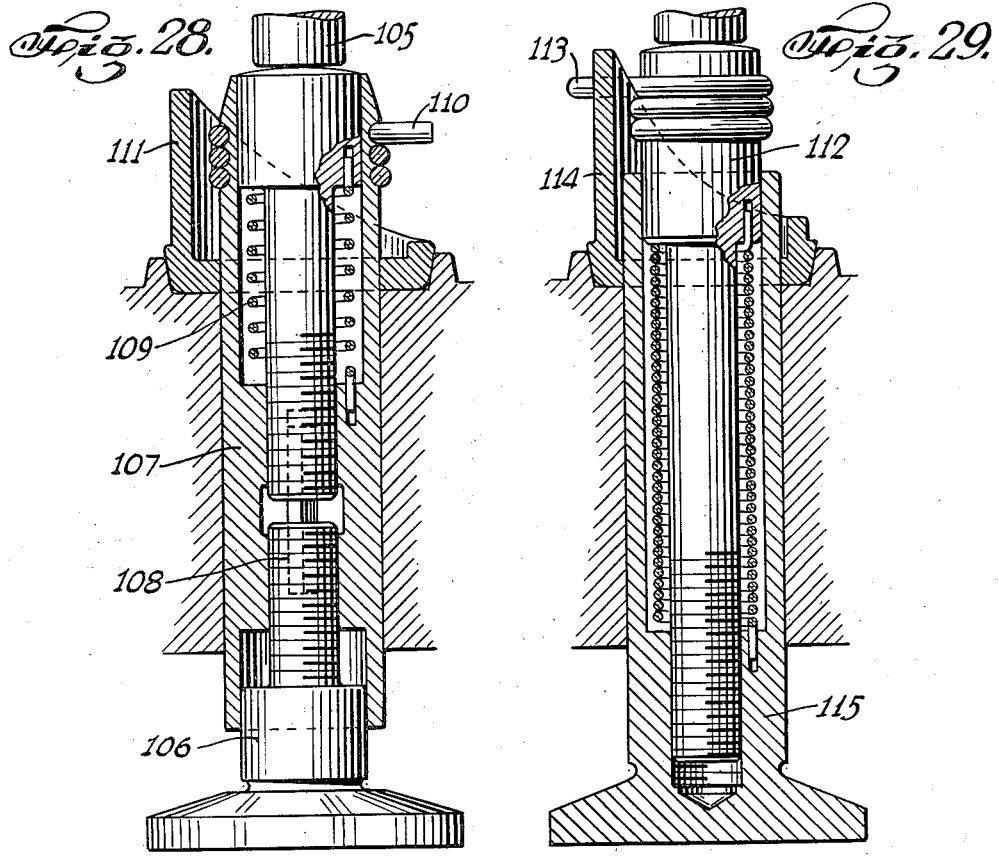
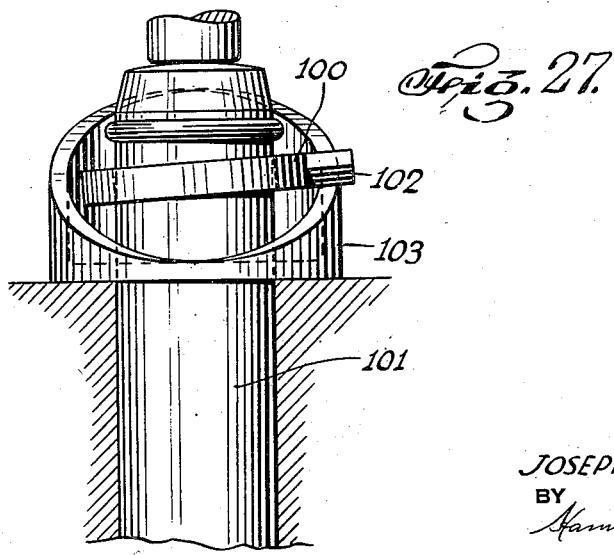
INVENTOR
JOSEPH A. ANGLADA
BY
ATTORNEYS July 13, 1943. J. A. ANGLADA 2,323,965
SLACK TAKE-UP DEVICE FOR TAPPETS
Filed April 12, 1939 8 Sheets-Sheet 8
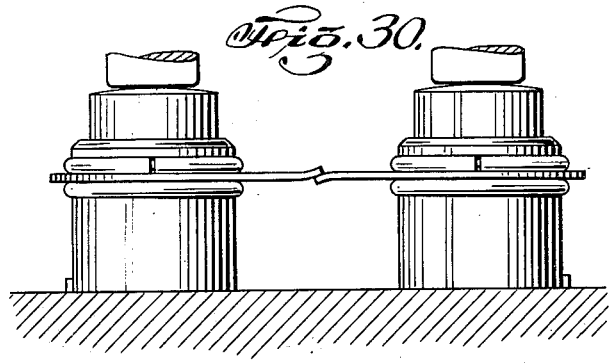
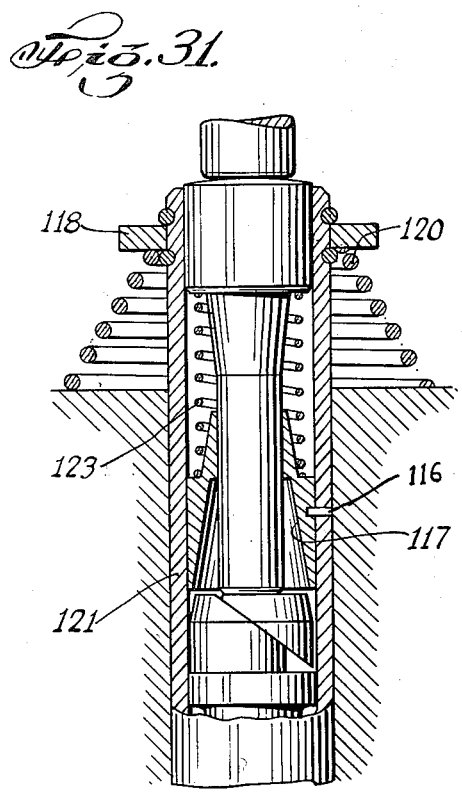
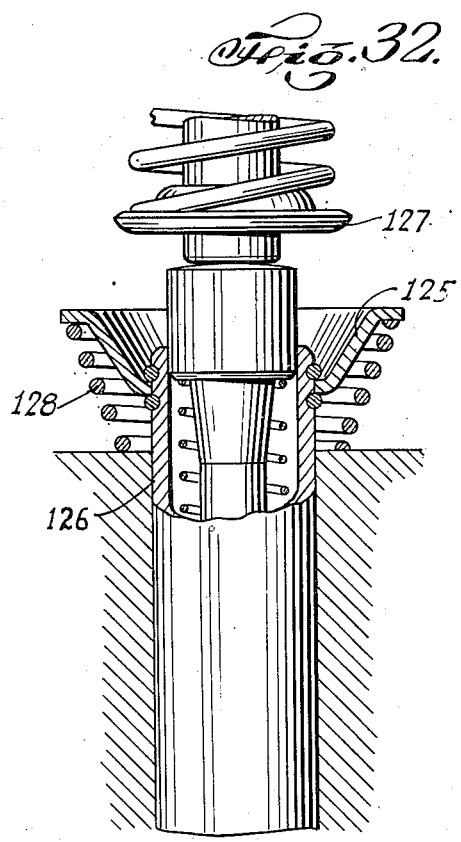
INVENTOR
JOSEPH A. ANGLADA
BY
ATTORNEYS

UNITED STATES PATENT OFFICE 2,323,965

SLACK TAKE-UP DEVICE FOR TAPPETS

Joseph A. Anglada, New York, N. Y.

Application April 12, 1939, Serial No. 267,415

23 Claims. (Cl. 123—90)

The present invention relates to zero lash devices for transmitting motion between operating parts, and has for an object to provide an improved device of general application for transmitting motion from one part to another, in which provision is made for compensating for lost motion.

The invention has been developed more particularly in the production of valve tappets to transmit motion from the cam shaft to the valves of an internal combustion engine and for the purposes of disclosing the principles of the invention such an embodiment will be described. It is to be understood, however, that the particular description is illustrative merely and that the inventive principles may be applied in various devices where lost motion take-up is desirable.

Under normal conditions of operation of internal combustion engines with the unavoidable changes of temperature, variations in the normal distance between the cam shaft and the valve stems occur causing lost motion and noise or inaccurate control of the valves. It is, therefore, desirable to provide valve tappets having provision for automatic compensation for this difference in distance wherein the tappet may be either shortened or lengthened during operation of the engine as conditions may require.

The invention aims, therefore, to provide an improved motion transmitting device having relatively adjustable parts which are automatically adjusted in use to effectively prevent lost motion.

Another object is to provide a motion transmitting device having automatically relatively adjustable members and improved means for holding said members in relatively adjusted position.

Another object is to provide an automatic lost motion take-up arrangement wherein adjustment occurs while the adjustable parts are relatively inoperative or in a state of rest between successive operative movements.

A further object is to provide an effective automatic lost motion take-up device especially adapted for use between the valves and cam shaft of an internal combustion engine of a design such that it can be expeditiously and economically manufactured.

It is also an object of the invention to provide a valve tappet or other motion transmitting member wherein provision is made for automatic readjustment of length at a moment when the actuating and actuated elements are in critical relative positions.

The invention provides in various embodiments motion transmitting devices having parts which are relatively adjustable to provide zero lash between an actuating member and an actuated member, and means for holding said members in relatively adjusted position, together with means for periodically releasing said holding means to permit readjustment of the parts to compensate for any difference in the distance between the actuating and the actuated elements which may have developed.

The nature and objects of the invention will be better understood from a description of particular illustrative embodiments thereof for the purposes of which description reference should be had to the accompanying drawings forming a part hereof and in which—

Figure 21:
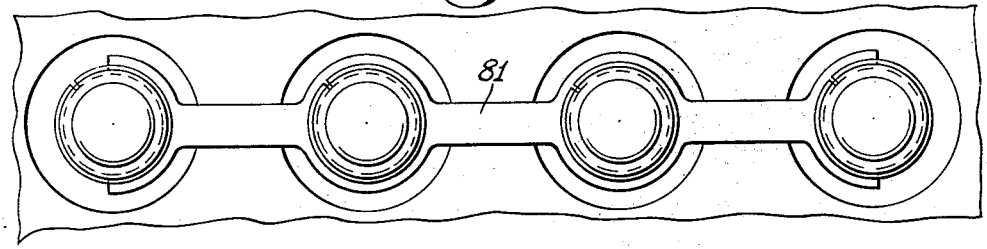
Figure 22:
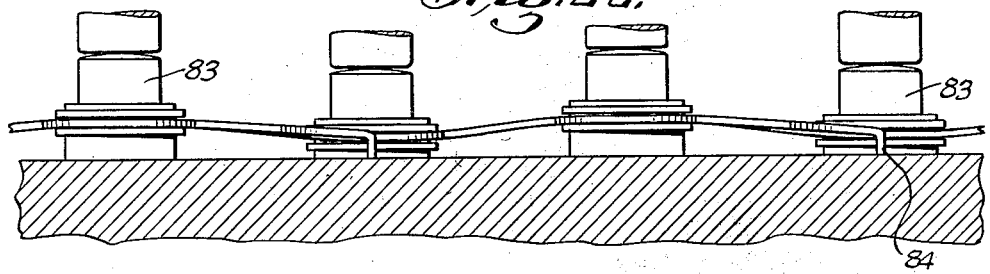
Figure 23:
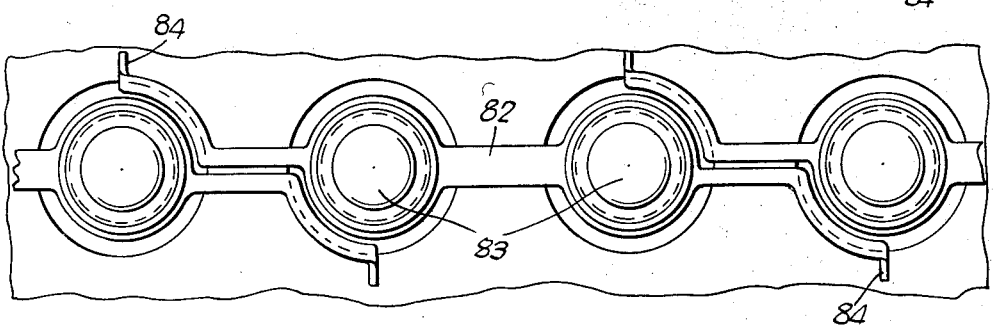

Figures 1 and 2 are, respectively, a top plan view and a sectional view of a valve operating tappet embodying certain principles of the invention, Figs. 3 and 4 are similar views of substantially the same tappet but showing the parts in different relative positions of adjustment, Fig. 5 is a sectional view of another form of abutment ring, Figs. 6 and 7 are, respectively, a top plan and sectional view showing a similar tappet but with a somewhat different form of cam releasing means, Figs. 8 and 9 are views similar to Figs. 6 and 7, but showing the parts in different positions, Figs. 10 and 11 are, respectively, top and side views of another embodiment of the invention showing a cam releasing device embodying a pivoted stop member, Fig. 12 is a view similar to Fig. 11, but showing the stop member in the position of first engagement, Fig. 13 is a sectional view showing a cam releasing arrangement including a cross-bar lifted by one tappet to lift the cam member of the other tappet, Fig. 14 is a view similar to Fig. 13, but showing a different form of cross-bar, Fig. 15 is a sectional view taken on the line 15—15 of Fig. 14, Fig. 16 is a view showing a cam lifting cross-bar which is guided to provide true vertical movement and to prevent angular movement, Fig. 17 is a sectional view showing another form of tappet and another cam lifting means, Fig. 18 is a sectional view taken on the line 18—18 of Fig. 16, Fig. 19 is a sectional view showing disks serving as cam lifting means, Figs. 20 and 21 are, respectively, a view in elevation and a plan view of a spring bar serving as a cam lifting member, Figs. 22 and 23 are, respectively, a view in elevation and a plan view of a cam lifting arrangement embodying levers, Fig. 24 is a view showing a cross-bar having a lever action in operation, Fig. 25 is a view showing a slight modification of the cross-bar of Fig. 4 also having lever action in operation, Fig. 26 is a side view of an embodiment of the invention wherein gear-like members on adjacent tappets engage each other momentarily to cause release of the cam, Fig. 27 is a view in elevation of a construction somewhat similar to that shown in Figs. 1 and 2 but with the ring loose on the cam operating sleeve, Fig. 28 is a sectional view showing a tappet wherein the relatively adjustable plungers interengage with a screw action, Fig. 29 is a similar view of a slightly different construction.

Fig. 30 is a side view of a device showing spring fingers operable to cause release of the locking cam, Fig. 31 is a side view in some respects similar to the arrangement shown in Fig. 2, but wherein a spring is substituted for the ring cam 22, and Fig. 32 is a view of an arrangement similar in principle to that of Fig. 31, but adapted for a tappet which projects in its uppermost position only a relatively slight distance above the tappet support.

In the illustrative embodiment shown in Figs. 1 to 4 of the drawings an automatically adjusting slack take-up tappet is shown arranged to transmit motion from the engine cam 5 to the valve stem 6. The tappet comprises upper and lower opposed plungers 7 and 8 which are held in spaced relation by wedge members 9 and 10 which in turn are pressed inwardly by a conical cam 11 yieldably urged downward by a spring 12. The opposed plungers are shown as movably mounted in the sleeve 15 to which the cam 11 is rigidly connected by a pin 16. An expansible spring ring 17 within the sleeve 15 and an exterior annular recess of the plunger 8 serves as a sufficient means for retaining the plunger in position in the sleeve when the tappet is not in place in the engine. The sleeve serves two purposes, first to maintain the plungers in suitable aligned relation, and second as a convenient means by which the cam 11 can be moved to wedge releasing position.

In Fig. 2 the sleeve 15 is shown as lifted and the cam 11, therefore, as releasing the wedges 9 and 10. The plungers also are shown as in position relatively close together corresponding to a short adjustment of the tappet which occurs, for example, when the distance between the cam 5 and the valve stem 6 is relatively small due, for example, to the expansion of the valve stem 6 from the heat of the engine.

In Fig. 4 the cam 11 is shown in its lower position pressed downward by the spring 12. In this figure the parts are shown in the position of adjustment in which the tappet is relatively long, a condition which occurs, for example, when the engine is cold. The difference in length of the two adjustments is exaggerated beyond what is reasonably to be expected.

The angles of the cam 11 and the wedges 9 and 10 must be so correlated to each other that when the cam is pressed downward by the spring 12 the parts will lock to avoid slip as the tappet is lifted by the cam 5 irrespective of the condition of lubrication. A substantial range in the selection of the angles is permissible. The conical surface of the cam 11 preferably forms a relatively acute angle with the axis of the cam. An angle the tangent of which is equal to or less than the coefficient of friction of the engaging surfaces when lubricated is preferred. An angle of 7 to 9° gives excellent results with perhaps 8½° as the optimum angle.

It is to be noted that this angle of 8½° corresponds to an angle of 17° as the included angle of the conical surface. If the angle between the conical surface and the axis of the cone is 8½° then the angle between the two wedges 9 and 10 should preferably be about 35 to 40° with an optimum at perhaps 38° in order to give the desired amount of adjustment of the tappet with a suitably limited axial movement of the cam.

The tappet tends to expand in length to the limit of the space between the cam and the valve stem in which it is situated. The spring 12 at all times presses the plunger 7 upward into contact with the valve stem 6 and when the parts are in the position shown in Fig. 4 it presses the cam 11 down, thereby urging the wedges 9 and 10 toward each other to take up any space between the two plungers. The wedges 9 and 10 thus serve as holding means or locking means while the cam 11 serves as retaining and releasing means to maintain the wedges in effective holding position during operative, lifting movement of the tappet and to release the wedges to permit readjustment at suitable times. Upon the lifting of the tappet by the cam 5 the adjustable parts are held in relative position to prevent lost motion and the valve stem is lifted the full distance. When because of the heating of the engine the valve stem lengthens and the tappet requires a shortening adjustment, this is accomplished by moving the cam 11 which serves as the retaining means to release position, thereby permitting the wedges 9 and 11 to move radially and apart. The strength of the spring 12 is much less than the strength of the valve spring (not shown) which normally tends to close the valve and move the valve stem 6 downward; therefore as the cam 11 is moved to release position the valve spring acting through the valve stem 6 will press the plunger 7 downward tending to press the wedges 9 and 10 apart. Immediately upon the release of the cam 11 and return downward movement thereof under the action of the spring 12, the wedges 9 and 10 will be moved toward each other to just fill the space between the two plungers and they will be held in this adjusted position by the cam 11. The strength of the spring 12 is such that the wedges will simply take up lost motion to provide zero lash but will not lift the valve from its seat. The friction of the engaging parts and the angles of all wedge members is suitably adjusted to the forces involved. Various arrangements may be provided for moving the cam 11 to the release position. When the cam presents a straight conical surface to the wedges 9 and 10 as shown, as distinguished from a construction in which the cam operates by rotation to press the wedges together, it may be released by a simple lifting movement.

This is most conveniently accomplished by a relative lift of the sleeve 15 or what amounts to the same thing by a retardation of the downward movement of the sleeve 15 during the downward movement of the tappet as a whole. In order to accomplish such release a ring 18 is mounted on the sleeve 15 between spring rings 19 and 20 fixed in grooves in the sleeve. This ring carries one or more projections 21 engageable, during the downward movement of the tappet, with the abutment ring 22. As the projections 21 engage the abutment ring the sleeve is momentarily retarded in its downward movement, thus releasing the cam 11 and permitting relative outward movement of the wedges 9 and 10. One or both of the ring members 18 and 22 are preferably rotatable. Also the tappet as a whole and especially sleeve 15 may be rotatable in the support and ordinarily the action of the cam 5 causes rotation of the tappet in the circumstances. There is, therefore, a relative rotation between the rings 18 and 22 whether or not either or both rotate on their supports. The projections 21 will engage the abutment ring 22 to relatively lift the sleeve 15 from time to time and with sufficient frequency to provide all necessary adjustment but there will be no regularity of the frequency of such operation. This operation is entirely sufficient to provide the necessary automatic zero lash adjustment and it offers a certain advantage in that the adjusting parts do not move with each operation of the valve. The angle of the operative face of the abutment ring and the freedom with which the ring 18 and the abutment ring rotate should be correlated to each other if these parts are in fact rotatable relative to the sleeve 15 and the support respectively so that the engagement of the projection 21 with the inclined face of the abutment ring 22 will actually retard the sleeve 15 in its downward movement and not simply rotate the ring 18 or the ring 22, or both. The jar of the engine will cause sufficient rotation of ring 18 or abutment ring 22 if loose to provide release of the cam periodically even if the sleeve 15 is not rotatable.

The ring 22 is shown as rotatable in Fig. 2 and as secured against rotation in Fig. 4 to illustrate the two different arrangements. The ring 18 also is shown as loose and rotatable in Fig. 2 and as keyed against rotation in Fig. 4 for the same purpose. In the arrangement wherein both are secured against rotation, the rotation of the tappet as a whole will be relied upon to occasionally bring the projections 21 into position operatively to engage the abutment ring 22. The projections 21 are shown as square in cross-section presenting therefore a downwardly directed edge the more certainly to avoid a possible hang-up of the projections on the uppermost edges of the abutment ring 22. It is probable that a hang-up of the valve sleeve 15 during the complete rotation of the cam shaft cannot occur under the conditions of operation of the engine, but the operation of the tappet is such that if this should occur the only practical result would be to open the valve slightly less than normally for one operation after which the parts would be restored to their normal relation.

In Fig. 5 a form of abutment ring 25 is shown in which one or two opposite upward projections 26 are provided to prevent movement of projections 21 past the top of the ring at any time. When a ring of this form is used, the rotation of the tappet by the cam during the valve lifting operation will bring the projections 21 against the upward projections 26 of the abutment ring in position surely to engage the abutment face during the downward movement of the tappet.

In Figs. 6 to 9 another embodiment of the invention is illustrated wherein the tappet parts including the sleeve 15 and the sleeve lifting ring 18 are the same as in the embodiment of Figs. 1 to 4, but the arrangement of the abutment ring with which the projections 21 of the ring 18 engage is slightly different. The abutment ring 27 is the same in function as the abutment ring 22, but is shown as having four high points instead of two. Above this ring and also engageable by the projections 21 is an opposed abutment ring 28 having four downwardly extending projections with intermediate diagonal faces. This abutment ring is substantially complementary in shape to the ring 27, but is turned at a slight angle relative thereto. Upward movement of the tappet and especially of sleeve 15 thereof brings the projections 21 against two of the inclined faces of the ring 28 and thereby turns the ring 18 on the sleeve 15 if sufficiently loose or turns the sleeve 15 also if the ring 18 is tight. Upon the return downward movement the projections will thus be properly placed to operatively engage a high part of the abutment ring 27.

In Figs. 10 to 12 an arrangement is shown wherein the cam controlling sleeve 15 carries a ring 30 which may or may not be rotatable between the spring retaining rings 31, 32. On the pivot pin 33 projecting from this ring a stop member 34 is yieldably held normally in the position shown in Fig. 12 by a spring 35. Upon downward movement of the tappet, this stop member engages the supporting frame of the engine momentarily to retard the downward movement of the sleeve but immediately the stop member swings about its pivot to the position shown in Fig. 11, thereby permitting the continued downward movement of the sleeve after a momentary dwell. This arrangement operates substantially as the arrangement shown in Figs. 2, 5 and 7 momentarily to retard the sleeve and therefore relatively to lift the cam to releasing position.

In Fig. 13 are shown two tappets 37 and 38 similar to the tappets previously described, except that the detail construction of the sleeves and of the lower plunger members is somewhat modified to cooperate with a different type of sleeve lifting and cam releasing device. As here shown, the lower plungers 39, 40 are formed with conical portions 41 which provide downwardly presented shoulders 42. A cross-bar 43 extends between and encircles both plungers. The end portions lie at a slight angle to the length of the cross-bar whereby as the cross-bar is lifted at one end by the rising of one tappet as indicated in the drawing, the cross-bar will bind upon the lifting tappet but will be quite free to move relative to the other tappet. The aperture in the cross-bar surrounding the plunger 40 is formed to provide a shoulder 44 engageable with the shoulder 42 of the plunger. The size of this aperture is such that it will engage at the point 45 with the other side of the plunger. By this arrangement the movement of the cross-bar angularly in the plane of the tappet is definitely limited by the binding of the cross-bar on the tappet. The cross-bar is also provided with a projection 46 engageable with the foot of the plunger 40. The aperture at the other end of the cross-bar encircling the plunger 39 because of its different angular position is substantially horizontal and quite free on the plunger. Accordingly, as the plunger 40 is lifted by its operating cam the cross-bar rises freely on the plunger 39 and lifts the sleeve of the tappet 37. It will be noted that during the lifting of the plunger 40 by the engine cam the cross-bar 43 will first move angularly in the plane of the tappets until it reaches the binding position, thus providing a measure of lost motion. Thereafter its further movement will operate to lift the cam controlling sleeve of the other tappet. The shape of the cross-bar is symmetrical and its operation to lift the sleeve of the tappet 38 when the tappet 37 is lifted by its cam is the same as its operation for lifting the sleeve of the tappet 37.

In Fig. 14 a variation of the arrangement illustrated in Fig. 13 is shown. In this construction the plungers 49 and 50 have portions 51 which are tapered downwardly instead of upwardly as in Fig. 13. The cross-bar 53 is provided with apertures receiving the plungers and the end portions lie at an angle to the length of the cross-bar in order that as in construction of Fig. 13 the cross-bar may bind on the lifting tappet but move freely on the plunger of the other tappet. As here shown the aperture of the cross-bar binds at 54 and 55 on the plunger 50 to limit the angular movement of the cross-bar relative to the plunger 50 in the plane of the tappets. The cam sleeve of the other tappet will be lifted to release the cam as in the construction shown in Fig. 13.

In Fig. 16 another form of cam sleeve lifting and releasing means is shown wherein also a lifting movement of either tappet will cause a lifting of the cam sleeve of the other tappet after a certain degree of lost motion. As shown a cross-bar 60 is slidably mounted on a stud 61 projecting downwardly from the frame of the machine. Each end of the cross-bar is provided with an aperture 62 receiving the lower end of the corresponding cam sleeve and upon upward movement of the cross-bar when lifted by the foot of the plunger of one tappet the upper edge of the cross-bar at the aperture will engage a shoulder 64 of the cam sleeve of the other tappet to lift it.

In Fig. 17 another embodiment is illustrated. The tappet is similar in principle to the tappet shown in Fig. 2, but it is somewhat different in construction. The outer member 65 serves the same function as the lower plunger 8 of Fig. 2. The upper plunger 66 is movable toward and from the casing 65 and the two parts are held in relative adjusted position by the wedge member 68, 68 which in turn are retained in adjusted position by the cam 69 urged downward by the spring 70. The cam member is formed at its upper end with an annular recess 71 which receives freely rotatable on the member a lifting element 72. The two lifting elements 72 on the companion tappets are connected by a lost motion link 73 in such manner that after a limited relative movement of one tappet during its upward movement it will lift the cam member of the other tappet, as in other embodiments of the invention. The lifting members 72 are sufficiently loose on the upper ends of the cam members to permit free rotation of the tappets as the engine cam engages them.

In Fig. 19 there is shown an embodiment in which a disk 75 is mounted on the upper end of one cam member and two disks 76, 77 are similarly mounted on the upper end of the cam member of an adjacent tappet. The tappet construction as illustrated is similar to the construction of the tappet shown in Fig. 17. The arrangement of the disks is preferably such as to provide a limited lost motion such that the cam member will be lifted during the latter part of the lifting movement of the other tappet. This may be accomplished by the spacing of the disks or by mounting the same somewhat loosely on the valve members to permit a relative vertical movement.

In Figs. 20 and 21 a cam lifting arrangement is illustrated in which the cam controlling elements 80 are engaged by a continuous flexible spring steel member 81. Upon the lifting of one tappet the spring bar 81 will lift the cam sleeves of adjacent tappets sufficiently to release the wedge holding means but the flexing of the spring will be sufficient to provide a desirable degree of lost motion.

In Figs. 22 and 23 still another arrangement is shown in which substantially rigid bars or levers 82 are connected to two adjacent cam lifting members 83 in a manner to permit limited pivotal movement relative thereto. The extended ends 84 of these members are bent downward to engage the support. When one tappet rises during operation, the bar will fulcrum about the farther fulcrum end 84 and thus lift the cam controlling member of the companion tappet. It will be noted that the bars 82 are of such shape that a series of bars may be provided for a row of valve tappets each being so formed as not to interfere with the operation of the others. By way of illustration the fulcrum point of each bar has been shown as positioned opposite the center of an adjacent tappet member, but it will be understood that the position of the fulcrum member can be modified to provide the length of lever desired. The construction may be variously modified while retaining the operative arrangement whereby the rising of one tappet lifts a lever which, in turn, lifts the cam releasing member of an adjacent tappet to release the holding means of said tappet.

In Fig. 24 the cross-bar 85 is carried on the lower plunger members 86 and 87 of adjacent tappets. The cross-bar is apertured to fit loosely over the plungers. When one end of the cross-bar is lifted by the upward movement of one plunger a projection 88 engages beneath the cam sleeve member of the other tappet while the end of the cross-bar fulcrums at 89 on the foot of the other plunger to lift said sleeve member and release the cam.

Fig. 25 is a view of a cross-bar 90 which is substantially similar in construction and operation to the cross-bar 85 except that the ends of the cross-bar are formed as open yokes and the fulcrum points 91 at the ends of the cross-bar engage the foot of the plunger in each case at a relatively central position to avoid cramping action.

In Fig. 26 similar gear-like members 95 having conical projections or teeth 96 are mounted on the upper ends of the cam lifting elements 97. The lifting members 95 are preferably, but not necessarily, rotatable on the cam lifting members. In operation when either tappet moves downward after its lifting action a conical projection of its member 95 may engage a corresponding conical projection of the other member 95 momentarily to release the cam, the operation being in many respects similar to that of the embodiment shown in Fig. 2. It will be understood that such engagement will not occur with every downward movement of a tappet, but it will occur at sufficiently frequent intervals.

In Fig. 27 is illustrated an arrangement which in general is of the character of the arrangement shown in Figs. 1 to 9, but in which the ring 100 is slidably mounted upon the tappet sleeve 101 and has only one projection 102 engageable with the top of ring 103 which may be either loosely or fixedly mounted on the support. The hole in the ring 100 is of a size to bind on the sleeve 101 in operation sufficiently momentarily to release the cam upon downward movement of the tappet if, and when, the projection 102 engages a sufficiently high point on the cam ring 103.

In Fig. 28 a tappet is shown comprising plungers 105 and 106 threaded into a sleeve 107 by right and left hand threads. The two plungers are connected to rotate together by a square spline member 108 loosely mounted in square axial holes in said plungers. The sleeve and plungers are normally urged in a rotational direction to extend the length of the tappet by a spring 109. The length of the tappet is adjusted to slightly shorten the tappet intermittently by engagement of a projection 110 during the downward movement of the tappet with a cam member 111 which may be either fixedly or rotatably mounted on the support. As shown, this cam member is rotatably but frictionally mounted with a conical engagement to provide a measure of friction while still permitting rotation. The weight of the plunger members 105 and 106 is sufficient and the threads free enough so that when the sleeve is given a slight quick rotation during the downward movement of the tappet by engagement of the projection 110 with the diagonal face of the cam member 111, the sleeve will rotate relative to both plungers to shorten slightly the tappet. The spring 109 will always serve to lengthen the tappet when necessary to prevent the occurrence of back lash.

In Fig. 29 a substantially similar construction is shown but in this construction the upper plunger 112 carries the pin 113 which engages the cam member 114 to rotate the plunger 112 in the sleeve 111 which also constitutes the bottom plunger.

In Fig. 30 an arrangement is shown in which two non-rotatable tappets are provided with spring fingers 116 which interengage and release the valve and then slip pass each other. These spring fingers are of such strength and resiliency that the releasing operation will be insured but the springs may flex to permit either to pass the other in turn.

In Fig. 31 is shown an arrangement in which the conical cam 117 is released by a yieldable action. In this arrangement the ring 118 in its downward movement engages a spring 120. The spring 120 is so designed as to its time of oscillation strength, etc. that during the downward movement of the sleeve 121 carrying cam 117 a retardation of said sleeve will occur which will release the cam to permit zero lash adjustment as in the arrangement of Fig. 2. The cam 117 is secured to the sleeve 121 by a pin 116 similar to pin 16 of Fig. 2. In this form of the device the design of the cam actuating spring 123, the valve seating spring of the engine and the release spring 120 must be so correlated to each other as to provide effective operation. The spring 120 may be of any desired design, helical, barrel-shaped, hourglass or simply conical as illustrated in the drawing. Springs of types widely different from that shown may be used. Preferably the spring is designed to provide a non-uniform rate of deflection.

The arrangement of Fig. 32 is in principle similar to that of Fig. 31. In this arrangement the valve tappet in its lowermost position projects only a slight distance above the tappet support and the valve stem with its spring and spring keeper in their lowermost position are relatively close to the valve support. The limited space requires a special arrangement. The locating washer 125 is suitably secured to the tappet sleeve 126 and is formed to project laterally outward from the tappet leaving a space for the descending spring keeper 127 of the valve stem. This ring nevertheless projects upward sufficiently to give ample space for the cam releasing spring 128 which is similar to the spring 120 but inverted.

The foregoing particular descriptions are illustrative merely and are not intended as defining the limits of the invention.

I claim:

1. A motion transmitting device comprising relatively adjustable members, yieldable means for causing relative movement between said members to take up lost motion between the driving and driven members and for holding said members in relative adjustment during operative movement and means for releasing said holding means during a period of rest of the motion transmitting device.

2. A valve tappet comprising, in combination, a sleeve, oppositely disposed relatively movable plungers in said sleeve, adjustable means for holding said plungers in relative adjusted relation arranged to be released by relative movement of said sleeve, and means to give a releasing relative movement to said sleeve comprising a ring rotatable on said sleeve and having a projection, and an abutment adjacent said sleeve and engageable by said projection during reciprocating movement of the tappet.

3. An automatically adjustable reciprocable valve tappet comprising, in combination, opposed members and means for holding the same in adjusted relation, means for releasing the holding means upon reciprocation of the tappet comprising a relatively fixed abutment and means carried by the tappet and engageable with the abutment to be temporarily retarded thereby.

4. In a valve operating mechanism the combination with a pair of valve stems and operating cams therefor of a pair of automatically compensating tappets therebetween, each tappet comprising a reciprocably mounted sleeve, opposed plungers movable longitudinally within said sleeve, a wedging member between said opposed plungers operable to hold said plungers in adjusted spaced relation, a cam operable to move said wedging member into wedging position and a spring tending to move the cam to press the wedging member into wedging position, together with a lost motion connection between the tappets operative upon valve lifting movement of either tappet to move the cam of the other tappet to release the wedging member.

5. In a valve operating mechanism the combination with a pair of valve stems and operating cams therefor of a pair of automatically compensating tappets therebetween, each tappet comprising a reciprocably mounted sleeve, opposed plungers movable longitudinally within said sleeve, a wedging member between said opposed plungers operable to hold said plungers in adjusted spaced relation, a cam operable to move said wedging member into wedging position and connected to said sleeve to be moved to release position thereby, and a spring tending to move the cam to press the wedging member into wedging position, together with a cross-bar connected to both tappets to be actuated by valve actuating movement of either tappet to move the sleeve of the other tappet to move its cam to release position.

6. In a valve operating mechanism the combination with a pair of valve stems and operating cams therefor of a pair of automatically compensating tappets therebetween, each tappet comprising an adjusting means and a cam actuating and releasing the same together with a cross-bar connected to the two tappets for pivotal movement relative thereto and a lost motion connection between the crossbar and each actuating and releasing cam to move the cam to releasing position.

7. In a valve operating mechanism the combination with a pair of valve stems and operating cams therefor of a pair of automatically compensating tappets therebetween, each tappet comprising a reciprocably mounted sleeve, opposed plungers movable longitudinally within said sleeve, a wedging member between said opposed plungers operable to hold said plungers in adjusted spaced relation, a cam operable to move said wedging member into wedging position and connected to said sleeve to be moved to release position thereby and a spring tending to move the cam to press the wedging member into wedging position, together with a cross-bar connected to both tappets for limited angular movement as the tappets move alternately, said cross-bar being engageable with the sleeves to move either sleeve to wedge releasing position upon actuation of the cross-bar by the other tappet.

8. In a valve operating mechanism the combination with a pair of valve stems and operating cams therefor of a pair of automatically compensating tappets therebetween, each tappet comprising opposed plungers, adjusting means between said plungers and a cam actuating and releasing the same, a cross-bar extending between the tappets and encircling a plunger of each tappet and movable angularly relative thereto, the angular movement of the cross-bar relative to the tappets being limited by a shoulder of the plunger of one tappet, the other end of the cross-bar moving freely on the plunger engaged thereby when the bar is lifted and operative to lift the cam of one tappet when actuated by the other tappet.

9. In a valve operating mechanism the combination with a pair of valve stems and operating cams therefor of a pair of automatically compensating tappets therebetween, each tappet comprising an adjusting means and a cam actuating and releasing the same together with a lifting member rotatably connected to the cam of each tappet, and a connection between said members to transfer at least a part of the vertical movement of one tappet to the cam of the other tappet.

10. In a valve operating mechanism the combination with a pair of valve stems and operating cams therefor of a pair of automatically compensating tappets therebetween, each tappet comprising an adjusting means and a cam actuating and releasing the same together with a cross-bar connected to the two tappets for pivotal movement relative thereto and operatively connected to the cams thereof, said bar having a fulcrum point spaced from both tappets about which fulcrum point the bar moves as a lever when actuated by one tappet to actuate the cam of the other tappet to release the adjusting means.

11. In a valve operating mechanism the combination with a pair of valve stems and operating cams therefor of a pair of automatically compensating tappets therebetween, each tappet comprising an adjusting means and a cam actuating and releasing the same together with a lifting member rotatably connected to the cam of each tappet, a lost motion connection between the lifting members whereby vertical movement of one tappet will lift the cam of the companion tappet through the rotatable lifting members.

12. In a valve operating mechanism the combination with a row of valve stems and operating cams therefor of a row of adjustable tappets between said valve stems and cams, each tappet comprising a cam and means controlled thereby for causing adjustment of said tappets, together with a flexible strip connecting the cams of said tappets and arranged to be actuated by movement of one of the cams of the tappets to actuate the cam of another tappet.

13. An automatically adjustable valve tappet comprising, in combination, opposed members threaded together, a spring tending to rotate said members relatively to lengthen the tappet and means operable intermittently to rotate said members relatively to shorten the tappet, substantially as described.

14. A motion transmitting device comprising relatively adjustable members, yieldable means for causing relative movement between said members to take up lost motion between the driving and driven members and for holding said members in relative adjustment during active motion transmitting movement and a coil spring encircling the device and cooperating with said yieldable means for momentarily releasing the same during return movement.

15. A valve tappet comprising, in combination, a sleeve, oppositely disposed relatively movable plungers in said sleeve, adjustable means for holding said plungers in relative adjusted relation arranged to be released by relative movement of said sleeve, and means to give a releasing relative movement to said sleeve comprising a coil spring encircling said tappet and coacting with the sleeve to cause releasing movement thereof during reciprocating movement of the tappet.

16. An automatically compensating tappet for use between a cam and valve comprising a reciprocable sleeve, opposed plungers movable longitudinally in said sleeve, a pair of opposed wedging members slidably engaging each other between said plungers operable to hold the plungers in adjusted spaced relation during valve lifting movement, a cam operative to move said wedging members into holding position, a spring tending to move the cam to press the wedging members into holding position and means for retracting the cam to release the wedging members during valve closing movement of the tappet.

17. In a valve operating mechanism, an automatically compensating tappet for transmitting movement from an operating cam to a valve stem, said tappet having an operative valve lifting movement and a return movement, said tappet comprising a sleeve, opposed plungers in said sleeve, a pair of oppositely disposed wedging members movable transversely in slidable engagement with each other between said plungers to hold the same in separated adjusted position, a cam for moving said wedging members into holding position carried by said sleeve, a spring tending to move said cam in a direction to move the wedging members into holding position and means coacting with said cam during its return movement to release said wedging members.

18. An automatically compensating tappet comprising a vertically movable sleeve, upper and lower opposed plungers movable longitudinally in said sleeve, a pair of wedging members between said opposed plungers movable transversely in said sleeve and slidably engaging each other to hold said plungers in adjusted spaced relation and having conical cam engaging surfaces, a cam within said sleeve presenting a conical surface engageable with the conical surfaces of said wedging members, a spring within said sleeve tending to move the cam to press the wedging members into holding position and means for giving relative movement to the cam to release the wedging members.

19. An automatically compensating tappet comprising a vertically movable sleeve, upper and lower opposed plungers movable longitudinally in said sleeve, a pair of wedging members between said opposed plungers movable transversely in said sleeve and slidably engaging each other to hold said plungers in adjusted spaced relation and having conical cam engaging surfaces, a cam within said sleeve presenting a conical surface engageable with the conical surfaces of said wedging members, a spring surrounding the upper plunger within said sleeve tending to move the plunger upward and the cam downward thereby pressing the wedging members into wedging position to hold said plungers in adjusted spaced relation and means for relatively lifting the cam to release the wedging members.

20. In a valve operating mechanism, an automatically compensating tappet, said tappet comprising a sleeve, opposed plungers in said sleeve, a pair of wedging elements having conical surfaces movable transversely in sliding engagement with each other between said plungers to hold the same in separated adjusted position, a cam for moving said wedging elements into holding position carried by said sleeve, a spring tending to move said cam in a direction to move the wedging elements into holding position and to separate said plungers, and means operating to move said sleeve to release said cam.

21. In a valve operating mechanism, an automatically compensating tappet comprising a reciprocable sleeve, opposed plungers movable longitudinally in said sleeve, a wedging member between said opposed plungers operable to hold said plungers in adjusted spaced relation during valve lifting movement, a cam operative to move said wedging member into wedging position and connected to be retracted by said sleeve, a spring tending to move the cam to press the wedging member into wedging position and a spring acting in opposition to the first mentioned spring and of sufficient strength and of such rate of deflection that it will operate momentarily to release said cam during valve closing movement of the tappet.

22. An automatically adjustable reciprocable valve tappet comprising, in combination, opposed plungers, opposed members adjustable between the opposed plungers to vary the length of the tappet, means for holding the same in adjusted relation including a member movable longitudinally relative to the tappet to release said opposed members, and a resisting element supported exteriorly of the tappet in the path of movement of said member and engageable by said member during movement of the tappet in one direction to cause movement of said member longitudinally with respect to the tappet to release the holding means.

23. A tappet of the character described for use between a cam and valve comprising a plunger and a sleeve, in which the plunger slides, said sleeve being slidable in a suitable guide during valve lifting and valve seating movement, spring means opposing movement of the sleeve for causing the sleeve to lag behind the plunger during valve seating movement of the tappet, adjusting means to decrease the effective length of the tappet when the sleeve lags behind the plunger during valve seating movement, and a spring acting on said adjusting means to increase said effective length of the tappet while the valve is seated.

JOSEPH A. ANGLADA.